(12) United States Patent
Bissen et al.

(10) Patent No.: US 11,905,156 B2
(45) Date of Patent: Feb. 20, 2024

(54) EFFICIENT DISINFECTION OF A BEVERAGE DISPENSER

(71) Applicant: RIPRUP Company S.A., St. Peter Port (GG)

(72) Inventors: Monique Bissen, Pforzheim (DE); Josef Schucker, Ronco Sopra Ascona (CH)

(73) Assignee: RIPRUP Company S.A., St. Peter Port (GG)

( * ) Notice: Subject to any disclaimer, the term of this patent is extended or adjusted under 35 U.S.C. 154(b) by 265 days.

(21) Appl. No.: 17/172,189

(22) Filed: Feb. 10, 2021

(65) Prior Publication Data

US 2021/0246010 A1    Aug. 12, 2021

(30) Foreign Application Priority Data

Feb. 10, 2020 (EP) .................................... 20156286

(51) Int. Cl.
| | |
|---|---|
| *B67D 1/07* | (2006.01) |
| *B67D 1/08* | (2006.01) |
| *G05B 15/02* | (2006.01) |

(52) U.S. Cl.
CPC ............. *B67D 1/07* (2013.01); *B67D 1/0884* (2013.01); *B67D 1/0888* (2013.01); *G05B 15/02* (2013.01); *B67D 2001/075* (2013.01)

(58) Field of Classification Search
CPC ...... B67D 1/07; B67D 1/0884; B67D 1/0888; B67D 2001/075; G05B 15/02
See application file for complete search history.

(56) References Cited

U.S. PATENT DOCUMENTS

| | | | |
|---|---|---|---|
| 10,464,799 B2* | 11/2019 | Carson ................ | B08B 9/0321 |
| 11,629,041 B2* | 4/2023 | McCann .............. | B67D 1/0887 |
| | | | 141/89 |

(Continued)

FOREIGN PATENT DOCUMENTS

| | | |
|---|---|---|
| WO | 2006066338 A1 | 6/2006 |
| WO | 2015127470 A1 | 8/2015 |
| WO | 2018136715 A1 | 7/2018 |

OTHER PUBLICATIONS

European Patent Office: "European Search Report"; dated Jun. 4, 2020; ESR in related EP Application No. 20156286.

(Continued)

*Primary Examiner* — Ramesh B Patel
(74) *Attorney, Agent, or Firm* — Bryan W. Bockhop; Bockhop Intellectual Property Law, LLC

(57) ABSTRACT

A method of disinfecting a beverage dispenser employs the following steps: disinfecting at least one beverage preparation device of the beverage dispenser as a preceding disinfection step; outputting the beverage by the beverage dispenser, wherein the beverage passes the at least one beverage preparation device; determining the set point of time of the next disinfection step since the preceding disinfection step depending on at least one of the following: volume of beverage output by the beverage dispenser; temperature of beverage output by the beverage dispenser; carbonization of beverage output by the beverage dispenser; further comprising the following steps: mineralizing the beverage with a plurality of ions; dispensing the beverage with a first temperature and mineralizing the beverage with a first concentration of hydrogen carbonate ions; and dispensing the beverage with a second temperature and mineralizing the beverage with a second concentration of hydrogen carbonate ions, wherein the first temperature is lower (Continued)

than the second temperature and the first concentration is higher than the second concentration.

15 Claims, 3 Drawing Sheets

(56) References Cited

U.S. PATENT DOCUMENTS

| | | | | |
|---|---|---|---|---|
| 2010/0187175 | A1* | 7/2010 | Kolios | C01B 11/20 |
| | | | | 210/188 |
| 2014/0166053 | A1* | 6/2014 | Carson | B08B 9/0321 |
| | | | | 222/30 |
| 2014/0239521 | A1* | 8/2014 | Ergican | B01F 23/236 |
| | | | | 261/DIG. 1 |
| 2019/0152757 | A1* | 5/2019 | Bissen | B67D 1/07 |
| 2020/0055721 | A1* | 2/2020 | Bissen | B67D 1/0884 |
| 2020/0055761 | A1* | 2/2020 | Bissen | C02F 9/00 |
| 2020/0180934 | A1* | 6/2020 | Bissen | B67D 1/0057 |
| 2020/0297156 | A1* | 9/2020 | Bissen | A47J 31/605 |
| 2020/0299122 | A1* | 9/2020 | Bissen | B67D 1/0857 |
| 2021/0032143 | A1* | 2/2021 | Bissen | C02F 9/00 |

OTHER PUBLICATIONS

Extended European Patent Office: "European Search Report"; dated Jun. 15, 2020; EESR in related EP Application No. 20156286.

* cited by examiner

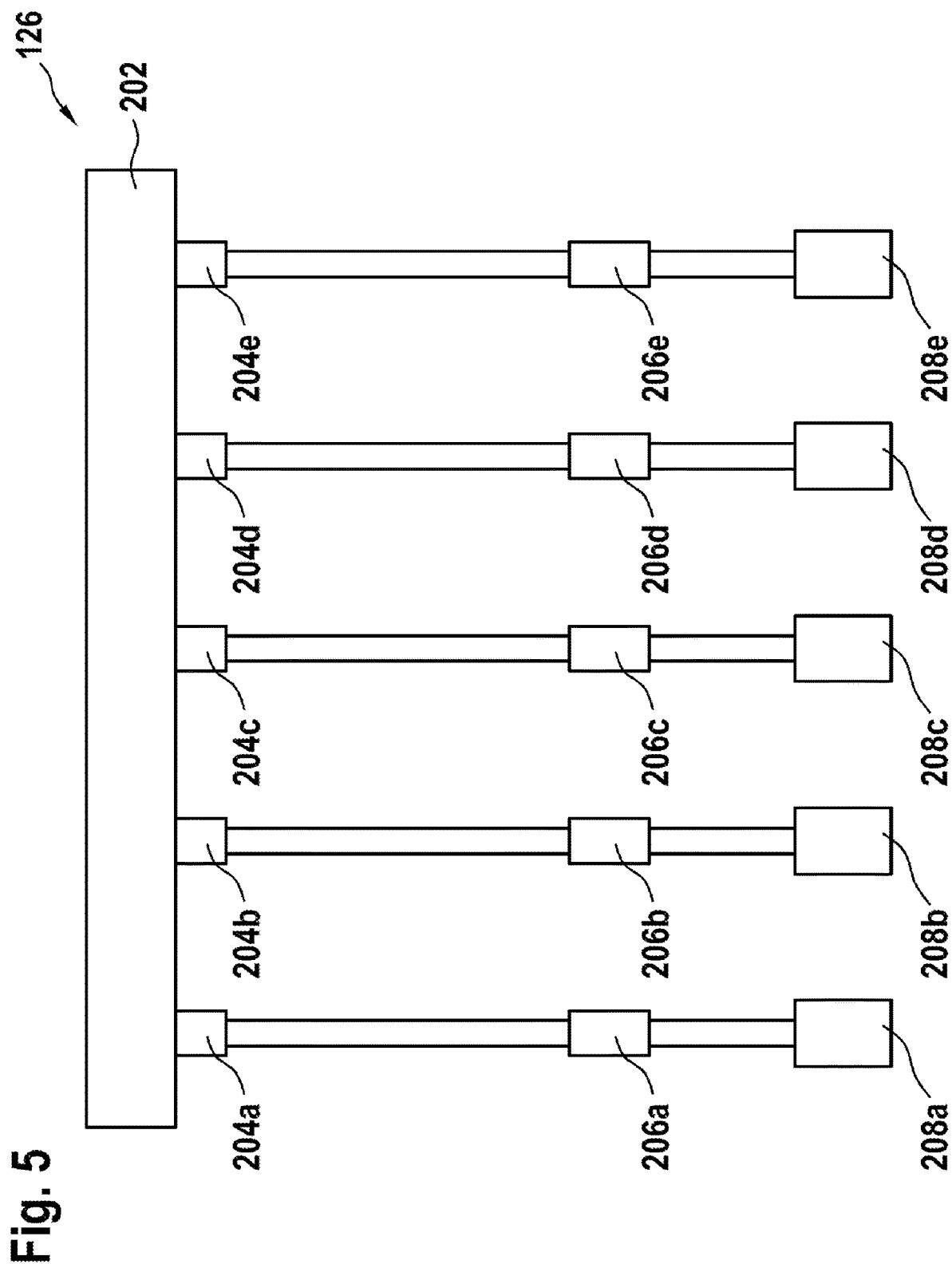

EFFICIENT DISINFECTION OF A BEVERAGE DISPENSER

CROSS-REFERENCE TO RELATED APPLICATION(S)

This application claims the benefit of European Patent Application No. EP20156286.5, filed Feb. 10, 2020, the entirety of which is hereby incorporated herein by reference.

BACKGROUND OF THE INVENTION

1. Field of the Invention

The present invention relates to a beverage dispenser for fulfilling high hygienic requirements. Particularly, the present invention relates to a beverage dispenser for use in households, restaurants, hotels, offices, hospital, nursing points or the like. The beverage dispenser is adapted for dispensing a beverage into a user vessel such as a glass, a carafe or a portable bottle. Particularly, the present invention relates to a beverage dispenser adapted to dispense beverage by a nozzle for a single person or for small groups of persons into a portable vessel such as a carafe or bottle. Small groups are considered to be formed by 2 to 20 persons. The beverage is output by a nozzle into the user vessel.

2. Description of the Related Art

Beverage dispensers are known to persons skilled in the art. In one type of beverage dispensers a small barrel or a bag, both made of plastics, are inserted into an inlet of a beverage dispenser and beverage from the barrel or bag is output by a nozzle. Some beverage dispensers can provide carbonated water upon request or cool the water upon request. Another type of beverage dispenser is connected to a water source such as tap water. The water can be filtered by a sediment filter, an activated carbon filter, an ion exchanger filter, a reverse osmosis filter or the like.

DE 20 2010 006 679 U1 discloses an apparatus for generating mineral water having a filter and at least one mineral container between the filter and the outlet. The apparatus further comprises a controller for controlling the feed of minerals from the at least one mineral container. If the water consumption by the user exceeds a daily limit of the daily water consumption, feeding of minerals is stopped or another specific formulated water is dispensed. WO 94/06547 A1 discloses a water purification and dispensing apparatus comprising a water inlet for obtaining water from a supply source, a water purification system for removing impurities from the source water and a mineral addition system for adding desired minerals into the purified water. U.S. Pat. No. 5,443,739 discloses a water purification and dispensing apparatus comprising a water inlet for obtaining water from a supply source, a water purification system for removing impurities of the source water and a mineral addition system for adding desired minerals to the purified water.

However, the above-described water dispensers suffer the disadvantage that germs are formed within the water dispenser. These germs are difficult to be removed in prior art water dispensers, since the water dispensers are generally made of plastics. Such plastic cannot be heated to a temperature, at which germs and other pathologic microorganisms are killed since plasticizers are emitted to the water, which is undesired from a health perspective. Further, prior art water dispensers suffer the disadvantage that water may stagnate in beverage preparation devices, such as tempering devices and carbonaters. Further, water may stagnate in plastic couplings, back taper or the like.

Therefore, the beverage dispensers have to be disinfected on regular basis. It is impossible for the average user to estimate, when the beverage dispenser has to be disinfected. If the beverage dispenser is not disinfected after the appropriate point in time, germs or other undesired biological films may form in the dispenser. If the beverage dispenser is disinfected before the appropriate point in time, the overall power consumption or agent consumption of the beverage dispenser increases.

SUMMARY OF THE INVENTION

It is an object of the present invention to provide a beverage dispenser having an efficient disinfection.

The object of the present invention is achieved by a method according to claim 1 and a beverage dispenser according to claim 12. The dependent claims relate to preferred embodiments.

A method of disinfecting a beverage dispenser comprises the step of disinfecting at least one beverage preparation device of the beverage dispenser as a preceding disinfection step. The beverage preparation device may be a tempering device, a carbonation device and/or a mineralization device for adding minerals into the beverage. The method outputs the beverage by the beverage dispenser, wherein the beverage passes at least one beverage preparation device. According to the present invention the method determines the set point of time for the next disinfection step since the preceding disinfection step depending on the volume of beverage output by the beverage dispenser and/or temperature of beverage output by the beverage dispenser and/or carbonation of beverage output by the beverage dispenser.

The method according to the present invention determines the appropriate point of time for disinfecting the beverage dispenser. Thereby, any formation of germs and biological films in the beverage dispenser can be prevented. Further, energy and disinfection agents are used efficiently for disinfecting the beverage dispenser at the appropriate point of time. Further, availability of the beverage dispenser is increased.

The disinfection step may be a thermal disinfection step. During the thermal disinfection step hot water may be generated by a heating device in the beverage dispenser.

In another embodiment the disinfection step may be a chemical disinfection step. During the chemical disinfection step disinfection agents may be passed through the at least one beverage preparation device.

The beverage dispenser may comprise a thermal disinfection device operated during the thermal disinfection step and adapted to heat a liquid to a temperature at which bacteria and/or virus and/or pathogenic microorganisms are killed. The output of the thermal disinfection device is coupled to the input port of at least one beverage preparation device. Preferably, the output of the thermal disinfection device is coupled with the most upstream beverage preparation device downstream of a demineralization device for demineralizing tap water, such as a reverse osmosis filter. The temperature of the liquid output by the thermal disinfection device may have a temperature of at least 65° C., more preferred at least 75° C., more preferred at least 80° C., most preferred at least 90° C. This high temperature can ensure that any microorganisms in a biological film in the conduits or water preparation devices are killed.

The beverage dispenser may further comprise a chemical disinfection device operated during the disinfection step, wherein the chemical disinfection device is adapted to output a liquid that is adapted to chemically kill bacteria and/or virus and/or pathogenic microorganisms, wherein the output of the chemical disinfection device is coupled to the input of at least one beverage preparation device. Preferably, the output of the chemical disinfection device is coupled with the input of the most upstream beverage preparation device downstream of the demineralization device. The chemical disinfection device may add a disinfection agent comprising silver ions, sodium hypochlorite, hydrogen peroxide sodium peroxodisulfate, ozone or the like to water flowing into the least one beverage preparation device.

The above method may be executed by a controller of the beverage dispenser. The controller may execute each step of the above method, such as by using a computer program product, in which the commands for executing the method are stored.

The controller may automatically start the disinfection step at the set point of time for the next disinfection step. The controller may be adapted to start disinfection shortly before the set point of time for the next disinfection step, such as during a period of low demand for beverage shortly before the set point of time for the next disinfection step. For example, if the beverage dispenser is installed in a household or office, the controller may execute the disinfection step during the night hours before the set point of time for the next disinfection step. In one embodiment, the set point of time of the next disinfection step may comprise the step of determining the set point of time of the next disinfection step depending on the volume of beverage output by the beverage dispenser since the preceding disinfection step. If a first volume of beverage is output by the beverage dispenser, the method determines a first set point of time for the next disinfection step. If a second volume of beverage is output by the beverage dispenser, a second set point of time for the next disinfection step is determined. The second volume of beverage is higher than the first volume of beverage and the second point of time is later than the first point of time. As a general rule, the more beverage is dispensed by the beverage dispenser the later the set point of time for the next disinfection step.

In one embodiment the method may calculate a volume deferment value. The volume deferment value is increased by a first volume value, if a first volume is dispensed. The volume deferment value is increased by a second volume value, if a second volume is dispensed. The first volume value is higher than the second volume value and the first volume is higher than the second volume.

In one embodiment, the term volume defines the total volume of beverage output by the beverage dispenser since the preceding disinfection step. The term volume may define a volume per time interval of beverage output by the beverage dispenser since the preceding disinfection step, such as a volume output in any time interval or the volume output in each time interval. In another embodiment the term volume is defined by the lowest volume per time interval of beverage output by the beverage dispenser since the preceding disinfection step. In a further embodiment the term volume is to be interpreted as the average volume per time interval of beverage output by the beverage dispenser since the preceding disinfection step. In yet another embodiment the term volume may be interpreted as the highest volume per time interval of beverage output by the beverage dispenser since the preceding disinfection step. The time range between the preceding and the next disinfection step may be divided into a plurality of intervals. An interval may range from several hours to 24 hours, for example. If during a particular interval no beverage or a low volume of beverage is dispensed by the beverage dispenser, there is a high risk of germ formation or formation of biological films. Thus, the inventive method may determine that the time range between the preceding disinfection step and the next disinfection step is reduced. In one embodiment the inventive method may calculate the intervals dynamically for determining that within a predetermined period only a volume lower than a crucial threshold has been dispensed by the beverage dispenser. In one embodiment, the interval is selected such that, if no beverage at all is dispensed by the beverage dispenser, the set point of time for the next disinfection step is the end of the interval, in which no beverage has been dispensed.

The volume deferment value may be determined during each beverage dispensing event. The volume deferment value may be accumulated to an accumulated volume deferment value, such as during each interval and/or during the entire period since the preceding disinfection step to the current time. The step of determining the set point of time for the next disinfection step may comprise the step of adapting the set point of time for the next disinfection step based on the accumulated volume deferment value.

The duration of the interval may be determined by the sampling theorem for detecting a period, in which no beverage was dispensed, wherein the period is so long that immediate disinfection is required. The duration of the interval may be shorter than half of the period, in which no beverage was dispensed, wherein the period is so long that immediate disinfection is required.

A user may select the temperature of each beverage volume to be output by the beverage dispenser, for example on a user interface, such as a touch sensitive screen. The beverage dispenser may prepare the beverage volume having the selected temperature by the at least one beverage preparation device and output the beverage volume into a user vessel. The inventive method may process the temperature of each of the beverage volumes dispensed by the beverage dispenser to determine a temperature deferment value. The temperature deferment value is increased by a first temperature-based value, if the temperature of the beverage volume is lower than a first predetermined temperature threshold. The temperature deferment value is increased by a second temperature-based value, if the temperature of the beverage volume is higher than the first predetermined temperature threshold. The second temperature-based value is larger than the first temperature-based value. The second temperature is higher than the first temperature, wherein the first and second temperature are in a first temperature range.

In one embodiment the temperature deferment value is increased by a first temperature-based value, if the temperature of the beverage has a first temperature. The temperature deferment value is increased by a second temperature-based value, if the temperature of the beverage volume has a second temperature. The second temperature is larger than the first temperature and the second temperature-based value is larger than the first temperature-based value, and the first and second temperature are in a first temperature range. The first temperature range is foreseen for dispensing warm or hot beverages. Generally speaking, beverage above a temperature of approximately 55° C., preferably above approximately 60° C., more preferred above approximately 65° C. has a disinfecting effect for preventing germ formation and formation of biological films. Thereby, the time point of the next disinfection can be delayed. The first temperature range ranges from approximately 55° C. to approximately 99° C., preferably from approximately 60° C. to approximately 99° C., more preferred from approximately 65° C. to approximately 99°.

In another embodiment the user may select the temperature of a beverage volume output by the beverage dispenser, for example on the user interface. The beverage dispenser may prepare the beverage volume having the selected temperature by at least one beverage preparation device and output the beverage volume into a user vessel. The method according to the present invention may process the temperature of each of the beverage volumes dispensed by the beverage dispenser to determine a temperature deferment value. The temperature deferment value is increased by a third temperature-based value, if the temperature of the beverage volume is lower than a second predetermined threshold. The temperature deferment value is increased by a fourth temperature-based value, if the temperature of the beverage volume is higher than the second predetermined threshold. The third temperature-based value is larger than the fourth temperature-based value and the second predetermined temperature threshold is lower than the first predetermined temperature threshold.

In one embodiment the temperature deferment value is increased by a third temperature-based value, if the temperature of the beverage volume has a third temperature. The temperature deferment value is increased by a fourth temperature-based value, if the temperature of the beverage volume has a fourth temperature. The third temperature-based value is larger than the fourth temperature-based value and the third temperature is lower than the fourth temperature. The third temperature and the fourth temperature are in a second temperature range and the second temperature range is lower than the first temperature range.

The second predetermined temperature threshold and the second temperature range are suitable for preparing beverage having a low temperature, such as beverage having a temperature between approximately 0° C. to approximately 15° C., preferably between approximately 0° C. to approximately 10° C., more preferred between approximately 0° C. to approximately 8° C. Particularly the second temperature range can range between approximately 0° C. to approximately 15° C., preferably between approximately 0° C. to approximately 10° C., more preferred between approximately 0° C. to approximately 8° C. When beverage having a low temperature that is within the second temperature range is dispensed, a lower temperature avoids germ formation and growth of biological films. Therefore, the deferment value is larger, if the beverage has a lower temperature within the second temperature range. If warm beverage having a temperature within the first temperature range is dispensed, a beverage having a higher temperature avoids germ formation and growth of a biological film. If the temperature of the beverage dispensed ranges between the first a second temperature range, the temperature deferment value may be 0.

The step of determining the set point of time for the next disinfection step may comprise the step of adapting the set point of time for the next disinfection step based on the temperature deferment value. In other words, the more deferring temperature criterion are met by the beverage dispensed, the later the set point of time for the next disinfection step. Criteria for deferring the set point of time for the next disinfection step are dispensing of beverage having a high temperature, such as above 60° C., or dispensing beverage having a low temperature, such as below 6°.

The temperature deferment value may be determined during each beverage dispensing event. The temperature deferment value may be accumulated to accumulated temperature deferment value, such as during each interval and/or during the entire period since the preceding disinfection step to the current time. The step of determining the set point of time for the next disinfection step may comprise the step of adapting the set point of time for the next disinfection step based on the accumulated temperature deferment value.

A user or the controller may select the carbonation of a beverage volume to be output by the beverage dispenser. The at least one beverage preparation device may carbonate the beverage with the selected carbonation. The beverage dispenser may output the beverage volume based on the selected carbonation into the user vessel. The method may process the carbonation of the beverage volume dispensed by the beverage dispenser to determine a carbonation deferment value. The carbonation deferment value is increased by a first carbonation value, if the carbonation of the beverage volume is lower than a predetermined carbonation threshold. The carbonation deferment value is increased by a second carbonation value, if the carbonation of the beverage volume is higher than the predetermined carbonation threshold. The first carbonation value is lower than the second carbonation value.

In one embodiment, the carbonation deferment value is increased by a first carbonation value, if the carbonation of the beverage volume is carbonated to a first $CO_2$ concentration. The carbonation deferment value is increased by a second carbonation value, if the carbonation of the beverage is carbonated to a second $CO_2$ concentration. The first carbonation value is higher than the second carbonation value and the first $CO_2$ concentration is higher than the second $CO_2$ concentration. In general terms, carbonation may have a disinfecting effect and therefore the set point of time of the next disinfection can be delayed to a higher extent the higher the $CO_2$ concentration of the beverage dispensed.

The method may further comprise the step of determining the set time for the next disinfection step by adapting the set point of time for the next disinfection step based on the carbonation deferment value. In general terms, carbonation may have a disinfecting effect and therefore the set point of time of the next disinfection can be delayed to a higher extent the higher the $CO_2$ concentration of the beverage dispensed.

The carbonation deferment value may be determined during each beverage dispensing event. The carbonation deferment value may be accumulated to an accumulated carbonation deferment value, such as during each interval and/or during the entire period since the preceding disinfection step to the current time. The step of determining the set point of time for the next disinfection step may comprise the step of adapting the set point of time for the next disinfection step based on the accumulated carbonation deferment value.

The method may instruct the beverage dispenser to mineralize the beverage with a plurality of ions. If the set temperature of beverage to be dispensed is below a predetermined scaling threshold, the method mineralizes the beverage with hydrogen carbonate ions. If the set temperature of beverage to be dispensed is above a predetermined scaling threshold, the beverage dispenser does not mineralize the beverage with hydrogen carbonate ions.

In one embodiment the beverage dispenser may dispense the beverage with a first temperature and mineralize the beverage with a first concentration of hydrogen carbonate ions. The beverage dispenser may dispense the beverage with a second temperature and mineralize the beverage with a second concentration of hydrogen carbonate ions. The first temperature is lower than the second temperature and the first concentration is higher than the second concentration. Mineralizing beverage having a low temperature with hydrogen carbonate ions improves taste of the beverage. Reducing the concentration of hydrogen carbonate ions to a lower concentration or not mineralizing beverage having a high temperature with hydrogen carbonate ions avoids scaling of the beverage dispenser.

The applicant reserves the right to file a divisional application for this aspect claiming the prevention of scaling without features of determining the set point of time for the next disinfection step.

The present invention also relates to a beverage dispenser comprising at least one beverage preparation device adapted to prepare beverage and a nozzle adapted to output beverage into a user vessel. A controller may be adapted to perform the steps of the above identified method.

The beverage preparation device may comprise a beverage tempering device coupled with the controller for tempering the beverage and/or a carbonation device coupled with the controller for carbonating the beverage and/or a mineralization device coupled with the controller for mineralizing the beverage. The beverage dispenser may further comprise an input unit, such as a touch sensitive display, coupled with the controller and adapted to receive a user selection for a type of beverage to be dispensed and/or a set temperature of beverage to be dispensed and/or a carbonation of beverage to be dispensed. The beverage dispenser may comprise a filter element filtering water supplied into the beverage dispenser, such as tap water. The filter element may be a reverse osmosis filter for completely demineralizing the water supplied into the beverage dispenser.

The controller may be adapted to instruct the mineralization device to mineralize the beverage with a plurality of ions. If the set temperature of beverage to be dispensed is below a predetermined scaling threshold, the controller instructs the mineralization device to mineralize the beverage with hydrogen carbonate ions. If the set temperature of beverage to be dispensed is above a predetermined scaling threshold, the controller instructs the mineralization device to not mineralize the beverage with hydrogen carbonate ions.

In one embodiment the controller is adapted to dispense the beverage with a first temperature and mineralize the beverage with a first concentration of hydrogen carbonate ions. The controller is further adapted to dispense the beverage with a second temperature and to mineralize the beverage with a second concentration of hydrogen carbonate ions. The first temperature is lower than the second temperature and the first concentration is higher than the second concentration for avoiding of scaling at high temperatures.

The beverage dispenser may comprise a thermal disinfection device coupled with the controller and arranged upstream of the at least one beverage preparation device as described above with respect to the method.

The beverage dispenser may further comprise a chemical disinfection device coupled with the controller and arranged upstream of the at least one beverage preparation device as described above with respect to the method.

The at least one filter device may be arranged upstream of the at least one beverage preparation device and/or the thermal disinfection device and/or chemical disinfection device.

The beverage dispenser may be embodied as described above with reference to the method according to the present invention.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The invention is now described in further detail with reference to exemplary and non-limiting embodiments with reference to the appended figures, wherein:

FIG. 5 shows details of the carbonation device.

DETAILED DESCRIPTION OF THE INVENTION

Figure 1:
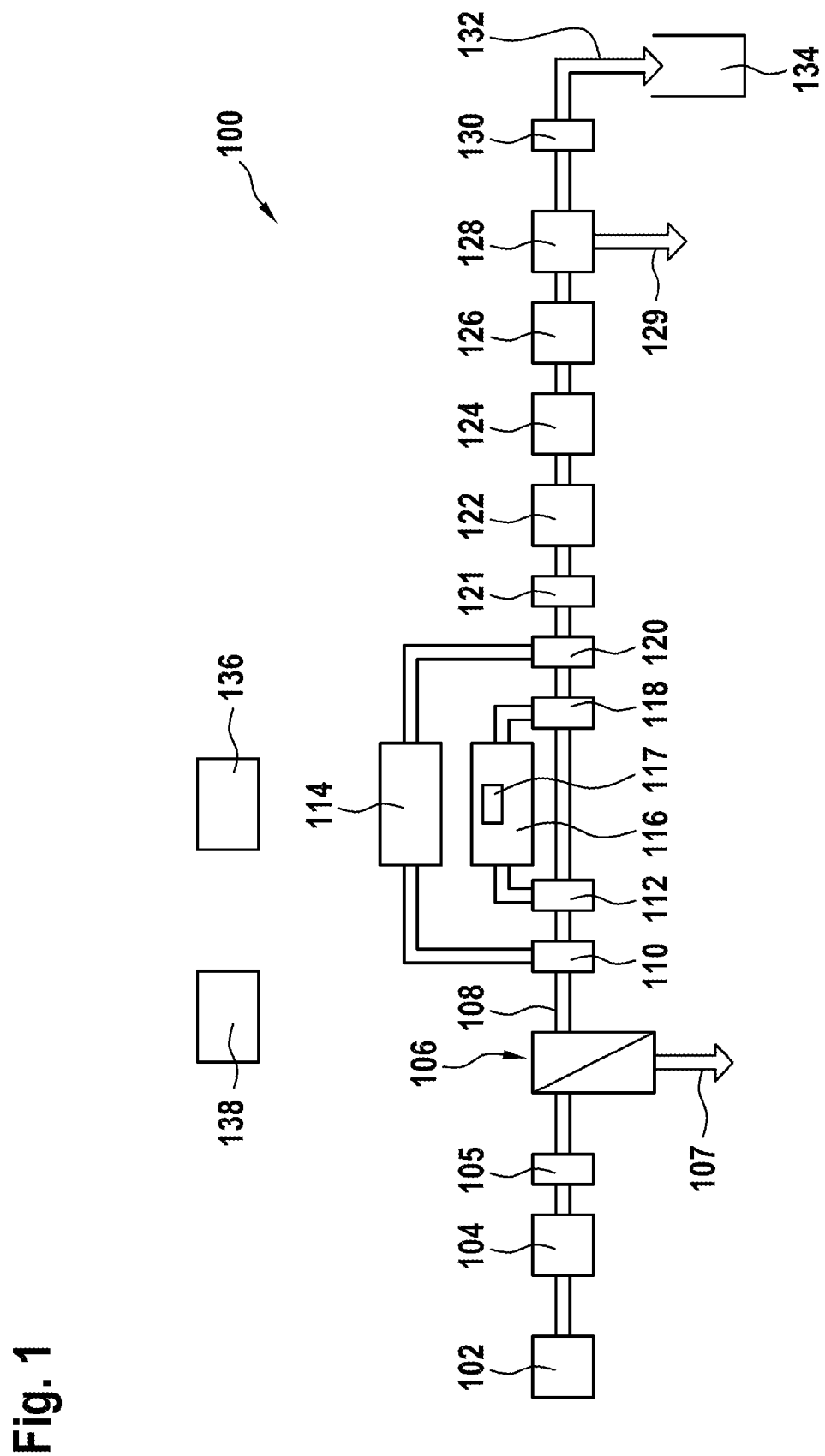
FIG. 1 shows a schematic overview of a water dispenser according to the present invention.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Reference is made to FIG. 1 showing a beverage dispenser 100 according to the present invention. The water dispenser 100 is connected to a water source 102 that may be tap water or a tank.

The water source 102 is connected by a conduit with a pre-filter 104 which may comprise a sediment filter and/or an activated carbon filter.

The pre-filter 104 is connected to a reverse osmosis filter 106 acting as demineralization device. The water drawn from the water source 102 is pressurized by a pump 105 before entering the reverse osmosis filter. Operation of a reverse osmosis filter 106 is known to the person skilled in the art, and therefore operation of the reverse osmosis filter 106 does not have to be explained in further detail. The concentrate in which the undesired components, such as minerals, heavy metals or the like are solved, as well as filtered microorganisms are output to a drain 107.

The permeate, which is formed by demineralized water is output to a conduit 108 coupled to a first valve 110. In normal operation the first valve 110 is switched such that the water is fed into a second valve 112, which is in normal operation switched such that the water is fed to a third valve 118. In normal operation the third valve 118 and a fourth valve 120 are switched such that the water (permeate) output by the reverse osmosis filter 106 is fed to a flow-type tempering device 122 forming a beverage preparation device. The flow-type tempering device is tempering the water to a temperature set by a controller 136. The water flows from an output of the flow-type tempering device to the input of a flow-type carbonation device 124 adding carbon dioxide to the water as set by a controller 136.

From an output of the flow-type carbonation device 124 forming also a beverage preparation device, the water flows to a flow-type mineralization device 126 also forming a beverage preparation device. The controller 136 controls the mineralization device 126 such that the water output by the flow-type mineralization device comprises the minerals desired by a user. The flow-type mineralization device 126 may comprise a plurality of vessels filled with mineralization fluid, wherein a plurality of micro metering pumps delivers the mineralization fluids in the respective desired quantity into the water flowing through an input of the flow-type mineralization device 126 to an output of the flow-type mineralization device 126. Such flow-type mineralization device is for example disclosed in the European patent application EP18207971.5, which is incorporated herein by reference. The water flows from the output of the flow-type mineralization device 126 to a fifth valve 128 and passes through a retrograde contamination prevention device 130, such as a UV light source, before it is output by a nozzle to a portable user vessel 134. The portable user vessel 134 may be a glass, a cup, a bottle, a carafe or the like. The portable user vessel 134 may be suitable for carrying beverage for a single person or a small group of persons, such as 2 to 10 persons.

The first valve 110, the second valve 112, the third valve 118, the fourth valve 120 and the fifth valve 130 are controlled by the controller 136. In normal operation the water flows from the permeate output of the reverse osmosis filter 106 through the first valve 110, the second valve 112, the third valve 118, the fourth valve 120, the flow-type tempering device 112, the carbonation device 124, the flow-type mineralization device 126, the fifth valve 128 and the retrograde contamination prevention device 130 through the nozzle 132 into the user vessel 134. The normal operation is the beverage dispensing operation mode. All components of conduits, of the first valve 110, the second valve 112, the third valve 118, the fourth valve 120, the flow-type tempering device 122, the flow-type carbonation device 124, the flow-type mineralization device 126, the fifth valve 128, the retrograde contamination prevention device 130 and the nozzle 132 are made of metal and/or glass that is biological inert. Also, the output port for permeate of the reverse osmosis filter 106 is made of biological inert material, particularly a biological inert metal. The biological inert metal may comprise stainless steel, VA steel, VA1 steel, VA2 steel, VA3 steel, VA4 steel or the like. A biological inert material is a material that does not serve as nutrition for germs, microorganisms, a biological film, bacteria, virus or the like. Germs cannot form on biological inert metal contrary to plastics. Thereby, germ formation and deposition of biological films are prevented.

In the beverage dispensing operation mode, the controller controls the pump 105 after a request of a user to dispense beverage such that in all beverage preparation devices 122, 124, 126 an equal flow rate is achieved.

The beverage dispenser 100 further comprises a thermal disinfection device 114 connected to the controller and a chemical disinfection device 116 connected to the controller 136. In a thermal disinfection mode, the controller 136 switches the first valve 110 such that water flows from the conduit 108 into the thermal disinfection device, and the fourth valve 120 such that water flows from the thermal disinfection device 114 to the flow-type tempering device 122, to the flow-type carbonation device 124 and the flow-type mineralization device 126. A fifth valve 128 is switched by the controller 136 in the thermal disinfection mode such that the water flows to a drain 129, where it is discarded.

The thermal disinfection device 114 heats the water to a temperature in which bacteria, virus and/or pathogenic microorganisms are killed. The temperature may be at least 80° C., preferably at least 90° C., more preferred at least 95°. Since surfaces contacting the water (beverage) are formed of metal and/or glass, the surfaces can be heated up to a temperature at which bacteria, virus and pathogenic microorganisms are killed. This is impossible with prior art beverage dispenser comprising plastic surfaces contacting the beverage.

The present invention has the advantage that reliable disinfection can be carried out after an appropriate time span without jeopardizing the long-term functionality of the beverage dispenser.

The water dispenser 100 further comprises a chemical disinfection device 116 controlled by the controller. The chemical disinfection device 116 comprises an opening 117 in which a cleaning agent may be inserted, such as a liquid or a solid material. The disinfection agent may comprise silver ions, sodium hypochlorite, hydrogen peroxide, sodium peroxodisulfate, ozone. The disinfection agent may be suitable to kill bacteria, virus and/or pathogenic microorganisms.

In the chemical disinfection mode, the controller 136 controls the first valve 110 and the second valve 112 such that water flows from the permeate output of the reverse osmosis filter 106 to the chemical disinfection device 116, in which the disinfection agent is supplemented to the water. The controller controls the third valve 118 and the fourth valve 120 such that water flows from the chemical disinfection device 116 to the flow-type tempering device 122, the flow-type carbonation device 124 and the flow-type mineralization device 126. From the output of the flow-type mineralization device the water flows to the fifth valve 128, which is switched such that the water flows to a drain 129, where it is discarded.

In one embodiment germ formation due to stagnation may be prevented by causing a forced flow of permeate through the demineralization device 106 and at least one of the beverage preparation devices 122, 124, 126, if no user request for dispensing beverage was received for a predetermined period of time. The predetermined period of time may be 3 to 6 hours. The permeate may have essentially the same temperature as the tap water or environment of the beverage dispenser.

The beverage dispenser according to the present invention further comprises an input device 138 such as a touch sensitive screen, by which the user may select the type of beverage and/or parameters of the beverage to be dispensed. The parameters of the beverage to be dispensed may comprise the temperature of the beverage, the carbonation of the beverage, the mineralization of the beverage, any type of flavoring agents or the like. The parameters may be individually selectable by a user or may be determined by predefined recipes or types of beverage displayed on a display.

Figure 2:
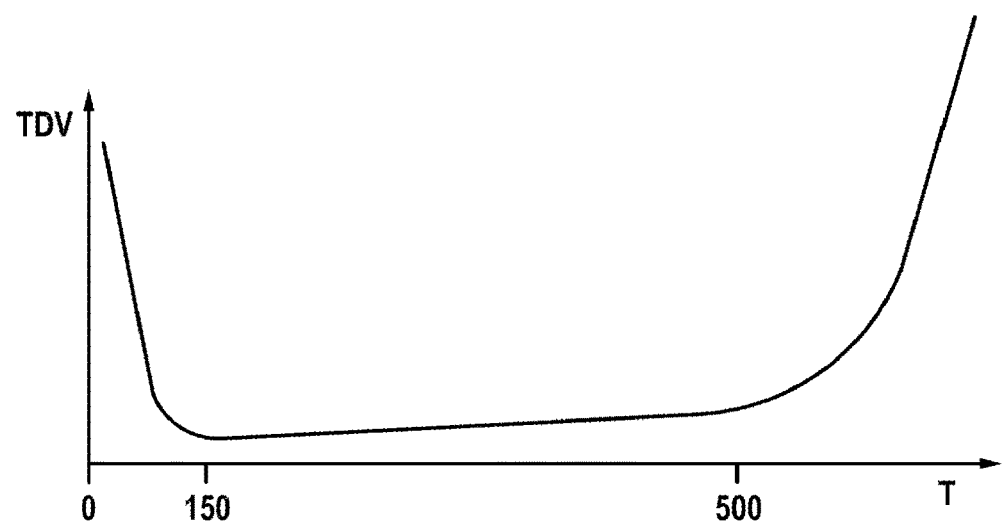
FIG. 2 shows a plot of the temperature deferment value versus temperature.
Figure 3:
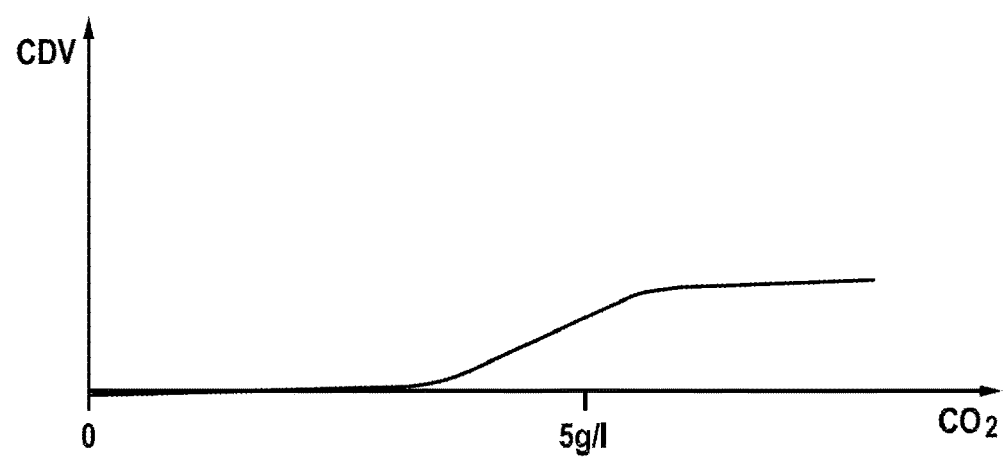
FIG. 3 shows a plot of the carbonation deferment value versus carbonation.
Figure 4:
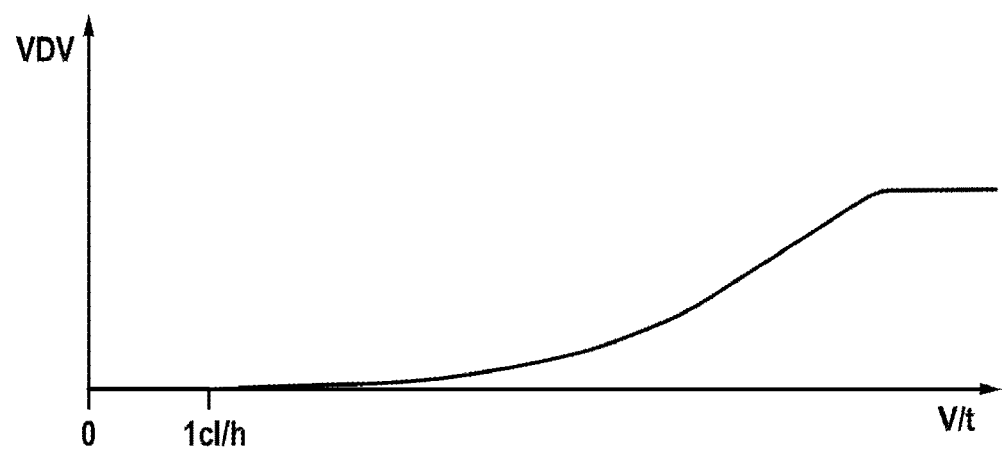
FIG. 4 shows a plot of the volume deferment value versus volume.

With reference to FIGS. 2 to 4 the inventive method for disinfecting the beverage dispenser, more particularly for disinfecting the beverage preparation devices 122, 124, 126 of the present invention is described in more detail with reference to a non-limiting embodiment. In a first step the method defines the earliest next disinfection time (ENDT). The earliest disinfection time is the earliest time in which next disinfection step is to be performed assuming the adverse operation conditions and environment condition in terms of disinfection. The earliest disinfection time may be the time, if no water is dispensed by the beverage dispenser or only low quantities of water are dispensed within a crucial temperature range in terms of disinfection, such as water having a temperature between 25° to 40°. Depending on the type of beverage dispenser and the environment of the beverage dispenser, the earliest next disinfection time may range between approximately 6 to approximately 12 hours from the preceding disinfection step.

With reference to FIG. 2 the dependency of the temperature of the beverage dispensed by the beverage dispenser 100 on the point of time for the next disinfection is explained. The x-axis denotes temperature and the y-axis a temperature deferment value (TDV). As a general rule, if very cold beverage, such as beverage between 0° and approximately 8° is dispensed in a significant volume, the next disinfection step may be delayed, because beverage having this temperature range at least partly prevents germ formation and formation of biological films or does not at least overly promote germ formation or formation of biological films. Further, dispensing beverage having a high temperature, such as beverage having a temperature of 55° C. or more prevents germ formation or formation of biological films. Thus, both dispensing cold beverage and hot beverage leads to a high temperature deferment value as depicted in FIG. 2.

With reference to FIG. 3 the dependency of the deferment of the point of time for the next disinfection on the carbonation of the beverage on is depicted. The x-axis shows the concentration of carbon dioxide in g/l and the y-axis shows the carbonation deferment value (CDV). The higher the concentration of carbon dioxide in the beverage, the higher the carbonation deferment value. Carbon dioxide reduces the multiplication of bacteria due to the low pH of the water. Bacteria prefer pH values around pH 7.0 and dislike an environment with low pH values (pH<6.0) or high pH values (pH>9.0). However, carbon dioxide cannot kill bacteria. Thus, as a general rule the higher the carbon dioxide concentration in the beverage, the later the next disinfection step has to be performed.

With reference to FIG. 4, the influence of the volume of beverage per time interval on the point of time of the next disinfection step is depicted. The x-axis shows the volume of beverage dispensed per time interval in cl/h and the y-axis shows the volume deferment value. As a general rule of thumb, the more volume dispensed per time interval, the higher the volume deferment value, since germ formation and formation of biological film is prevented, if a high volume per time interval is dispensed by the beverage dispenser. Bacteria multiply more rapid, if water is stagnating as compared to flowing water.

The volume deferment value and/or the carbonation deferment value and/or the temperature deferment value may be accumulated by any suitable method to calculate the appropriate point of time for the next disinfection step. The appropriate method of accumulating may depend on the actual beverage preparation devices installed in the beverage dispenser, the environment of operation, such as temperature and humidity and the like.

The method may determine accumulated deferment value (ADV) for estimating the next appropriate time for the next disinfection based on the earliest next disinfection time. Formula [1] is a linear approximation for calculating an estimate of the accumulated deferment value:

$$ADV = \sum_{t=0}^{t_{cur}} b_1 \sum_{i=1}^{n_t} (a_1 VDV_{ti} + a_2 TDV_{ti} + a_3 CDV_{ti} + a_4 V_{ti} TDV_{ti} + a_5 V_{ti} CDV_{ti}); \quad [1]$$

wherein:
ADV is the accumulated deferment value;
$VDV_{ti}$ is the volume deferment value during the time interval t and the dispensing event i;
$TDV_{ti}$ is the temperature deferment value during time interval t and dispensing event i;
$CDV_{ti}$ is the carbonation deferment value during the time interval t and the dispensing event i;
$V_{ti}$ is the dispensed volume during the time interval t and the dispensing event i;
$a_1$ is a first factor of proportionality;
$a_2$ is a second factor of proportionality;
$a_3$ is a third factor of proportionality;
$a_4$ is a third factor of proportionality;
$a_5$ is a third factor of proportionality;
$b_1$ is a fourth factor of proportionality;
t denotes the time interval from the preceding disinfection step to the current time;
$t_{cur}$ is the current time;
i denotes the dispensing event; and
$n_t$ denotes the number of dispensing events during the time interval t.

At least one of the factors of proportionality $a_1$, $a_2$, $a_3$ and $b_1$, particularly $a_1$, can be one. Particularly, the linear approximation according to formula [1] assumes that a temperature deferment value has to be rated higher if a higher volume of beverage is dispensed. Further, the linear approximation of formula [1] assumes that the carbonation deferment value has to be weighted higher, if a large volume is dispensed. Further, formula [1] assumes that there is a linear relationship between the accumulated deferment value and the volume of dispensed beverage per time interval.

The inner sum calculates a first accumulated deferment value per time interval t for all drinking events n. The outer sum calculates the total accumulated deferment value over all time intervals t up to the current time $t_{CUR}$.

Formula [1] is only an exemplary embodiment and any other approximation is conceivable.

Independent of the applied formula or approximation, the factors of proportionality $a_1$, $a_2$, $a_3$, $a_4$, $a_5$ and $b_1$ can be adapted depending on the design of the beverage preparation devices, such as the flow-type tempering device 122, the flow-type carbonation device 124 and/or the flow-type mineralization device 126, and the environment, where the beverage dispenser is operated, such as the geographical location, environment temperature and humidity in the environment of the beverage dispenser. Further, other formulas than formula [1] may be applied depending on the design of the beverage dispenser and its components as well as the environment parameters, such as geographical location, environment temperature and humidity of the environment.

Formula [2] shows one example of another approximation, in which high volumes are weighted to a lower extend, by multiplying the square root of the volume $V_{ti}$ with the $TDV_{ti}$ and $CDV_{ti}$, respectively:

$$ADV = \sum_{t=0}^{t_{cur}} b_1 \qquad [2]$$

$$\sum_{i=1}^{n_t} (a_1 VDV_{ti} + a_2 TDV_{ti} + a_3 CDV_{ti} + a_4 \sqrt{V_{ti} TDV_{ti}} + a_5 \sqrt{V_{ti} CDV_{ti}});$$

wherein:
ADV is the accumulated deferment value;
$VDV_{ti}$ is the volume deferment value during the time interval t and the dispensing event i;
$TDV_{ti}$ is the temperature deferment value during time interval t and dispensing event i;
$CDV_{ti}$ is the carbonation deferment value during the time interval t and the dispensing event i;
$V_{ti}$ is the dispensed volume during the time interval t and the dispensing event i;
$a_1$ is a first factor of proportionality;
$a_2$ is a second factor of proportionality;
$a_3$ is a third factor of proportionality;
$a_4$ is a third factor of proportionality;
$a_5$ is a third factor of proportionality;
$b_1$ is a fourth factor of proportionality;
t denotes the time interval from the preceding disinfection step to the current time;
$t_{cur}$ is the current time;
i denotes the dispensing event; and
$n_t$ denotes the number of dispensing events during the time interval t.

Formula [2] takes into account the influence of the volume of beverage on the disinfection effect is not linear but be reduced, when very high volumes are dispensed.

The set point of time for the next disinfection step (next disinfection time; NDT) is calculated according to the following formula [3]:

$$NDT = ENDT + ADV; \qquad [3]$$

wherein:
NDT is the next disinfection time;
ENDT is the earliest next disinfection time; and
ADV is the accumulated deferment value.

The set time point for the next disinfection step may also be calculated by AI such a neuronal network.

Reference is made to FIG. 5 showing a further aspect of the present invention. FIG. 5 shows details of the flow-type carbonation device 126. The flow-type carbonation device 126 comprises a beverage conduit 202, through which beverage to be mineralized passes. The mineralization device 126 comprises a plurality of mineralization bottles 208a, 208b, 208c, 208d, 208e, to which a plurality of micro metering pumps 206a, 206b, 206c, 206d and 206e are connected. Each micro metering pump meters mineralization fluid from a mineralization vessel via a respective inlet 204a, 204b, 204c, 204d, 204e into the beverage conduit 202, where beverage to be mineralized passes.

Each mineralization vessel 208a, 208b, 208c, 208d, 208e comprises a different combination of solved ions.

The first mineralization vessel 208a may comprise a calcium chloride solution, the second mineralization vessel 208b may comprise a magnesium chloride solution and the third mineralization vessel 208c may comprise magnesium sulfate. The fourth mineralization vessel 208d may comprise sodium hydrogen carbonate solution and the fifth mineralization vessel 208e may comprise a potassium hydrogen carbonate solution. Each micro metering pump 206a to 206e is connected with the controller 136.

The user may select a suitable mineralization by selecting a type of beverage, such as a water recipe, or manually adjust the minerals in the water. Depending on the water recipe and/or on the user selection the controller instructs the micro-metering pumps 206a to 206e to meter the appropriate volume of mineralization fluid in the mineralization vessels 208a to 208e into the beverage conduit 202. If the temperature of the beverage dispenser is low, such as below approximately 30° C. ions from all mineralization vessels 208a to 208e are metered into the beverage to be mineralized, namely calcium chloride, magnesium chloride, magnesium sulfate, sodium hydrogen carbonate and potassium hydrogen carbonate. If the temperature increases the amount of hydrogen carbonate ions metered into the beverage to be mineralized is reduced and/or particularly reduced so far that no hydrogen carbonate ions are metered into the beverage to be mineralized in the beverage conduit 202.

Particularly, the controller 136 instructs the micro-metering pumps 206d and 206e to meter a lower volume of sodium hydrogen carbonate from mineralization vessel 208d and potassium hydrogen carbonate from mineralization vessel 208e into the beverage to be mineralized, if the temperature of the beverage to be mineralized increases. In one embodiment, the controller 136 may instruct the micro-metering pumps 206d and 206e to meter no hydrogen carbonate ions from mineralization vessels 208d and 208e, namely sodium hydrogen carbonate and potassium hydrogen carbonate, into the beverage to be mineralized in the beverage conduit, if the temperature of the beverage to be mineralized is above a predetermined threshold, such as approximately 30° C., preferably 40° C., more preferred above approximately 50° C. At temperatures above approximately 30° C. scaling may occur, if hydrogen carbonate ions are metered into water, in which also calcium and magnesium ions are metered.

Thereby scaling and precipitation of calcium carbonate and magnesium carbonate is avoided.

The present invention determines an appropriate interval for disinfecting a beverage dispenser for ensuring proper operation of the beverage dispenser and avoiding germ formation or formation of biological films. Further, an excess usage of energy and chemical disinfection agents is avoided. Further, the present invention avoids scaling in a beverage dispenser, if hot beverage is to be dispensed.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of disinfecting a beverage dispenser comprising the following steps:
    disinfecting at least one beverage preparation device of the beverage dispenser as a preceding disinfection step;
    outputting the beverage by the beverage dispenser, wherein the beverage passes the at least one beverage preparation device; and
    determining a set point of time for execution of a next disinfection step after execution of the preceding disinfection step, wherein determination of the set point in time depends on at least one of the following:
        volume of beverage output by the beverage dispenser;
        temperature of beverage output by the beverage dispenser; and
        carbonation of beverage output by the beverage dispenser; and
    executing the next disinfection step by disinfecting the at least one beverage preparation device of the beverage dispenser at the set point in time.

2. The method according to claim 1, wherein at least one of preceding disinfection step and the next disinfection step comprises a thermal disinfection step.

3. The method according to claim 1, wherein at least one of preceding disinfection step and the next disinfection step comprises a chemical disinfection step.

4. The method of claim 1, wherein the step of determining the set point of time of the next disinfection step further comprises the steps of:
    determining the set point of time of the next disinfection step depending on the volume of beverage output by the beverage dispenser since the preceding disinfection step, wherein
    if a first volume of beverage is output by the beverage dispenser, then a first set point of time for the next disinfection step is determined,
    if a second volume of beverage is output by the beverage dispenser, then a second set point of time for the next disinfection step is determined,
    the second volume of beverage is higher than the first volume of beverage and the second point of time is later than the first point of time.

5. The method according to claim 4, wherein the volume is defined by at least one of the following:
    the total volume of beverage output by the beverage dispenser since the preceding disinfection step;
    a volume per time interval of beverage output by the beverage dispenser since the preceding disinfection step;
    the lowest volume per time interval of beverage output by the beverage dispenser since the preceding disinfection step;
    the average volume per time interval of beverage output by the beverage dispenser since the preceding disinfection step; and
    the highest volume per time interval of beverage output by the beverage dispenser since the preceding disinfection step.

6. The method according to claim 1, further comprising the following steps:
    selecting the temperature of a beverage volume output by the beverage dispenser;
    preparing the beverage volume having the selected temperature by the at least one beverage preparation device;
    outputting the beverage volume into a user vessel; and
    processing the temperature of each of the beverage volumes dispensed by the beverage dispenser to determine a temperature deferment value,
    wherein the temperature deferment value has a first temperature-based value, if the temperature of the beverage volume has a first temperature, and the temperature deferment value has a second temperature-based value, if the temperature of the beverage volume has a second temperature;
    wherein the second temperature is larger than the first temperature and the second temperature-based value is larger than the first temperature-based value, wherein the first and second temperature are in a first temperature range.

7. The method according to claim 1, further comprising the following steps:
    selecting the temperature of a beverage volume output by the beverage dispenser;
    preparing the beverage volume having the selected temperature by the at least one beverage preparation device;
    outputting the beverage volume into a user vessel; and
    processing the temperature of each of the beverage volumes dispensed by the beverage dispenser to determine a temperature deferment value,
    wherein the temperature deferment value has a third value, if the temperature of beverage volume has a third temperature, and the temperature deferment value has a fourth temperature value, if the temperature of the beverage volume has a fourth temperature;
    wherein the third value is larger than the fourth value, wherein the third temperature is lower than the fourth temperature, wherein the third temperature and the fourth temperature are in a second temperature range and the second temperature range is lower than the first temperature range.

8. The method according to claim 6 wherein the step of determining the set point of time for the next disinfection step further comprises the following step:
    adapting the set point of time for the next disinfection step based on the at least one temperature deferment value.

9. The method according to claim 1, further comprising the following steps:
    selecting the carbonation of a beverage volume output by the beverage dispenser;
    outputting the beverage volume based on the selected carbonation into the user vessel; and
    processing the carbonation of the beverage volumes dispensed by the beverage dispenser to determine a carbonation deferment value, wherein the carbonation deferment value is increased by a first carbonation value, if the carbonation of the beverage volume is carbonated to a first $CO_2$ concentration, and the carbonation deferment value is increased by a second carbonation value, if the carbonation of the beverage volume is carbonated to a second $CO_2$ concentration; wherein the first carbonation value is higher than the second carbonation value and the first $CO_2$ concentration is higher than the second $CO_2$ concentration.

10. The method according to claim 9, wherein the step of determining the set point of time for the next disinfection step further comprises the following step:
adapting the set point of time for the next disinfection step based on the at least one carbonation deferment value.

11. The method according to claim 1, further comprising the following steps:
mineralizing the beverage with a plurality of ions;
dispensing the beverage with a first temperature and mineralizing the beverage with a first concentration of hydrogen carbonate ions; and
dispensing the beverage with a second temperature and mineralizing the beverage with a second concentration of hydrogen carbonate ions,
wherein the first temperature is lower than the second temperature and the first concentration is higher than the second concentration.

12. A beverage dispenser, comprising:
at least one beverage preparation device adapted to prepare beverage;
a nozzle adapted to output beverage into a user vessel; and
a controller that is programmed to execute actions comprising:
disinfect the at least one beverage preparation device of the beverage dispenser as a preceding disinfection step;
output the beverage by the beverage dispenser, wherein the beverage passes the at least one beverage preparation device; and
determine a set point of time for execution of a next disinfection step after execution of the preceding disinfection step, wherein determination of the set point in time depends on at least one of the following:
volume of beverage output by the beverage dispenser;
temperature of beverage output by the beverage dispenser; and
carbonation of beverage output by the beverage dispenser; and
execute the next disinfection step by disinfecting the at least one beverage preparation device of the beverage dispenser at the set point in time.

13. The beverage dispenser according to claim 12, wherein the beverage preparation device comprises at least one of the following:
a beverage tempering device coupled with the controller for tempering the beverage;
a carbonation device coupled with the controller for carbonating the beverage; and
a mineralization device coupled with the controller for mineralizing the beverage;
wherein the beverage dispenser further comprises an input unit coupled with the controller and adapted to receive a user selection for at least one of the following:
a set temperature of beverage to be dispensed; and
a carbonation of beverage to be dispensed.

14. The beverage dispenser according to claim 12, wherein the controller is adapted to:
instruct the mineralization device to mineralize the beverage with a plurality of ions;
dispense the beverage with a first temperature and mineralizing the beverage with a first concentration of hydrogen carbonate ions; and
dispense the beverage with a second temperature and mineralizing the beverage with a second concentration of hydrogen carbonate ions,
wherein the first temperature is lower than the second temperature and the first concentration is higher than the second concentration.

15. The beverage dispenser according to claim 12, wherein the beverage dispenser further comprises at least one of:
a thermal disinfection device coupled with the controller and arranged upstream of the at least one beverage preparation device; and
a chemical disinfection device coupled with the controller and arranged upstream of the at least one beverage preparation device.

* * * * *